United States Patent
Zia et al.

(10) Patent No.: US 11,030,458 B2
(45) Date of Patent: Jun. 8, 2021

(54) GENERATING SYNTHETIC DIGITAL ASSETS FOR A VIRTUAL SCENE INCLUDING A MODEL OF A REAL-WORLD OBJECT

(71) Applicant: Microsoft Technology Licensing, LLC, Redmond, WA (US)

(72) Inventors: Muhammad Zeeshan Zia, Kirkland, WA (US); Emanuel Shalev, Sammamish, WA (US); Jonathan C. Hanzelka, Kenmore, WA (US); Harpreet S. Sawhney, Redmond, WA (US); Pedro U. Escos, Seattle, WA (US); Michael J. Ebstyne, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 125 days.

(21) Appl. No.: 16/132,329

(22) Filed: Sep. 14, 2018

(65) Prior Publication Data

US 2020/0089954 A1    Mar. 19, 2020

(51) Int. Cl.
G06K 9/00 (2006.01)
G06N 20/00 (2019.01)
G06T 19/00 (2011.01)

(52) U.S. Cl.
CPC ..... *G06K 9/00671* (2013.01); *G06K 9/00201* (2013.01); *G06N 20/00* (2019.01); *G06T 19/006* (2013.01)

(58) Field of Classification Search
CPC ........... G06K 9/00671; G06K 9/00201; G06N 20/00; G06T 19/006
See application file for complete search history.

(56) References Cited

U.S. PATENT DOCUMENTS

| 2013/0135304 | A1* | 5/2013 | Chen | G06T 17/00 345/420 |
|---|---|---|---|---|
| 2014/0079314 | A1 | 3/2014 | Yakubovich et al. | |

(Continued)

OTHER PUBLICATIONS

"Visual Intelligence made easy", Retrieved from: https://azure.microsoft.com/en-us/services/cognitive-services/custom-vision-service/, Retrieved on Aug. 1, 2018, 17 Pages.

(Continued)

*Primary Examiner* — Leon Viet Q Nguyen

(57) ABSTRACT

The disclosure herein describes training a machine learning model to recognize a real-world object based on generated virtual scene variations associated with a model of the real-world object. A digitized three-dimensional (3D) model representing the real-world object is obtained and a virtual scene is built around the 3D model. A plurality of virtual scene variations is generated by varying one or more characteristics. Each virtual scene variation is generated to include a label identifying the 3D model in the virtual scene variation. A machine learning model may be trained based on the plurality of virtual scene variations. The use of generated digital assets to train the machine learning model greatly decreases the time and cost requirements of creating training assets and provides training quality benefits based on the quantity and quality of variations that may be generated, as well as the completeness of information included in each generated digital asset.

20 Claims, 5 Drawing Sheets

(56) References Cited

U.S. PATENT DOCUMENTS

| | | | | |
|---|---|---|---|---|
| 2017/0213395 | A1* | 7/2017 | Yu | G06T 19/20 |
| 2018/0047208 | A1* | 2/2018 | Marin | H04N 13/243 |
| 2018/0374253 | A1* | 12/2018 | Yu | G06T 15/005 |
| 2020/0082629 | A1* | 3/2020 | Jones | G02B 27/0172 |

OTHER PUBLICATIONS

Li, et al., "Deep Supervision with Shape Concepts for Occlusion-Aware 3D Object Parsing", In the Repository of arxiv, arXiv:1612.02699, Dec. 8, 2016, 10 Pages.

"International Search Report and Written Opinion Issued in PCT Application No. PCT/US2019/038860", dated Dec. 6, 2019, 16 Pages.

Su, et al., "Render for CNN: Viewpoint Estimation in Images Using CNNs Trained with Rendered 30 Model Views", In the Repository of arxiv, arXiv:1505.05641, May 21, 2015, 13 Pages.

* cited by examiner

GENERATING SYNTHETIC DIGITAL ASSETS FOR A VIRTUAL SCENE INCLUDING A MODEL OF A REAL-WORLD OBJECT

BACKGROUND

Using trained machine learning models to enable recognition of and interaction with real-world objects by computer applications and associated devices has significant implications in a variety of fields, including industrial automation, data science, consumer products, etc. However, the effort and resources required to effectively train a machine learning model to accurately recognize real-world objects remain a substantial hurdle that may prevent widespread use of the technology. In many cases, the training data that is needed to train a machine learning model to a sufficient level of accuracy represents several challenges. For instance, the quantity of images or video frame data required may number into the millions, requiring substantial time and effort for creation and/or collection. Further, to be effective, the training data should include sufficiently representative and varied instances to ensure that the associated training process is comprehensive enough to produce a well-rounded model. Additionally, each instance of training data, whether it be an image, video file, or the like, should be labeled or annotated to indicate the location of the real-world object to be recognized, a process that may require hundreds of hours of manual effort before the training of the model can begin. Even when the training data has been collected and annotated, training the model based such training data may still be inefficient, as annotating all of the features of each and every training image manually is simply not feasible. While machine learning models that are able to accurately recognize and interact with real-world objects in a variety of environments may provide substantial advantages, the initial resource costs of creating and training such models are significant.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method and system for generating virtual scene variations based on a 3D model of a real-world object is described. A digitized three-dimensional (3D) model representing the real-world object is obtained and a virtual scene is built around the 3D model. A plurality of virtual scene variations of the virtual scene and the 3D model is generated by varying one or more characteristics of the virtual scene, wherein each virtual scene variation is generated to include at least one label identifying the 3D model in the virtual scene variation. The virtual scene variations may be used to train a machine learning model, such that the trained machine learning model is configured to be applied to visual data to identify the real-world object in the visual data.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 5, the systems are illustrated as schematic drawings. The drawings may not be to scale.

DETAILED DESCRIPTION

Aspects of the disclosure provide a system and method for training a machine learning model to recognize a real-world object based on training using digitally generated assets. A digitized three-dimensional (3D) model representing the real-world object is obtained and a virtual scene is built around it. A plurality of virtual scene variations based on the virtual scene and the 3D model are then generated by varying one or more characteristics of the virtual scene. The variations are generated to include a label identifying the 3D model in the virtual scene variation. A machine learning model may then be trained based on the generated plurality of virtual scene variations. Upon completion of the training of the machine learning model, the trained machine learning model is configured to be applied to visual data to identify the real-world object in the visual data.

The described methods and systems provide an automated way to generate a large quantity of synthetic or virtual training data in the form of scene variations that include a 3D model of the target real-world object. The training data is generated in such a way that it is representative of scenes in which the real-world object may be found. Further, the virtual training data may be generated at a substantially faster rate than manual processes for collecting real-world data. The scene variation generation process includes "machine labeling" processes that operate in an unconventional way to automatically include identifying, descriptive labels any objects, assets, or features in a scene variation that may be used for classification of the associated feature and/or other purposes during the model training process. This approach allows for application of labels to objects, parts of objects, or the like throughout the scene, even enabling label application to occluded or obstructed portions of the objects or other assets and also enabling the use of greater quantities of and types of labels. The presence of such labels may enable the trained model to predict or classify aspects of real-world data that is not visible (e.g., portions of an object in a picture that may be obstructed by another object or truncated by a picture boundary, etc.). The described systems and methods provided users with a user-friendly, seamless way to create a trained machine learning model by simply providing a 3D model as input.

Figure 1:
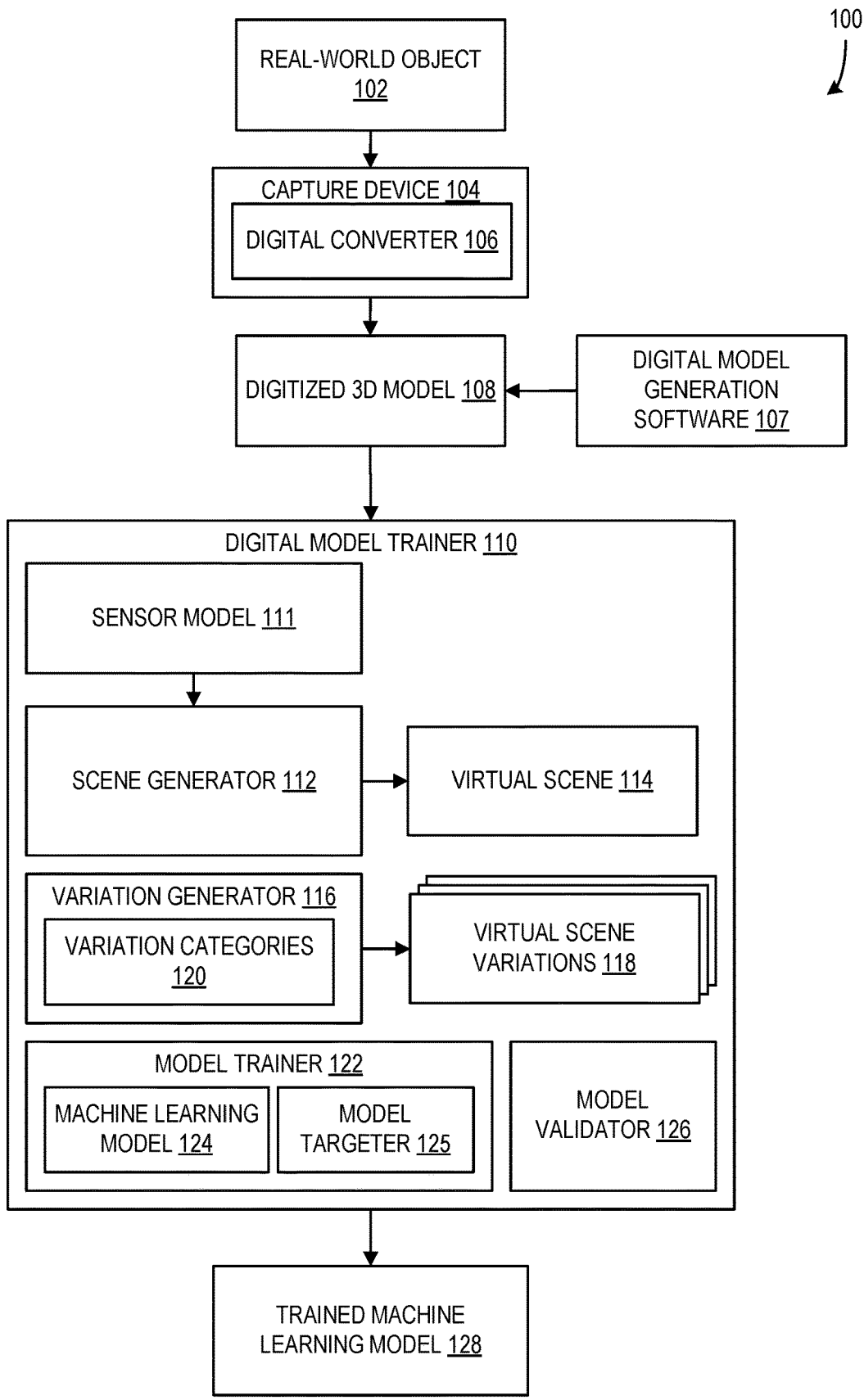
FIG. 1 is an exemplary block diagram illustrating a system configured for generating a plurality of virtual scene variations and training a machine learning model to recognize a real-world object according to an embodiment.

FIG. 1 is an exemplary block diagram illustrating a system 100 configured for generating a plurality of virtual scene variations and training a machine learning model 124 to recognize a real-world object 102 according to an embodiment. The system 100 includes a capture device 104 that is configured to capture image and/or video data of the real-world object 102. A digital converter 106 of the capture device 104 converts the capture data into a digitized three-dimensional (3D) model 108 of the real-world object 102. Alternatively, or additionally, digital model generation software 107 may be used to generate some or all of the digitized 3D model 108 instead of or in combination with the capture device 104 and digital converter 106. The digitized 3D model 108 is provided to a digital model trainer 110.

The capture device 104 may be a camera, mobile phone, tablet, laptop computer, or any other computing device capable of capturing image data, video data, other optical data, and/or other types of data (e.g., LIDAR-captured data, etc.) of the real-world object 102. In some examples, the capture device 104 is configured to capture data associated with the real-world object 102 from a variety of positions, angles, and/or distances. Such image data is provided to the digital converter 106, which uses the various perspectives of the captured data to generate the digitized 3D model 108. It should be understood that the digital converter 106 may be configured to perform the conversion to the 3D model 108 using any conversion methods and/or techniques as would be understood by a person of ordinary skill in the art without departing from the description.

Alternatively, or additionally, the digital model generation software 107 may be used in conjunction with the digital converter 106 to generate the 3D model 108 or the 3D model 108 may be generated entirely by the digital model generation software 107 without the use of captured data from the capture device 104. The digital model generation software 107 may be used by a user to adjust aspects of the 3D model 108 prior to providing it to the digital model trainer 110. For instance, a user may use the digital model generation software 107 to adjust a particularly unique aspect of the real-world object 102 in the 3D model 108 to make the model 108 more abstract or generalized, such that the machine learning model 128 is not trained to recognize the object 102 based heavily on the very unique aspect.

The digitized 3D model 108 includes data that defines and/or describes the shapes, angles, and/or positions of various portions of the real-world object 102 in the 3D model 108 format. The data may further describe other aspects of the real-world object 102, such as color of surfaces, reflectivity of surfaces, texture of surfaces, opacity of the object and/or portions of the object, etc. The 3D model 108 may be generated and stored in any format (e.g., computer-aided drafting (CAD) files, etc.) as would be understood by a person of ordinary skill in the art without departing from the description. The granularity and/or resolution of the 3D model 108 may be based on the format in which it is generated, settings and/or aspects of the capture device 104 with which the data is captured, and/or configuration selections made by a user or otherwise programmed into the digital converter 106 and/or digital model generation software 107 that affect digital model generation processes. In some examples, the highest quality 3D model 108 may be provided to the digital model trainer 110 to obtain a trained machine learning model 128 that is highly accurate at recognizing the real-world object 102 based on a wide variety of specific features thereof. Recognizing the real-world object 102 may include recognizing the identity of the real-world object 102 (e.g., recognizing a specific industrial part, etc.) and/or recognizing particular features or attributes of the real-world object 102 as described herein (e.g., the 3D location of the object, the angular orientation of the object, etc.). Alternatively, a 3D model 108 that is limited in quality and/or features that are present (e.g., the 3D model 108 may include shapes, angles, and positions of portions of the real-world object 102 and data describing color, texture, reflectivity, and/or other aspects of the object 102's appearance may be limited and/or generalized away, etc.), such that the trained machine learning model 128 may be trained to recognize the real-world object 102 and other objects that are generically similar (e.g., identifying multiple types of cars rather than a single model of car, etc.). While such limitations may reduce the accuracy of the model 128's recognition in some circumstances, it may be desirable to enable the model 128 to recognize multiple objects of the same type.

The digital model trainer 110 is a component of system 100 that includes hardware, firmware and/or software configured to generate a trained machine learning model 128 based on the digitized 3D model 108. The digital model trainer 110 includes a scene generator 112 configured to generate a virtual scene 114 based on data received from a sensor model 111, a variation generator 116 configured to generate a plurality of virtual scene variations 118 based on the virtual scene 114 and defined variation categories 120, a model trainer 122 configured to train a machine learning model 124 using the virtual scene variations 118 and/or other digital assets. A model targeter 125 is configured to direct the training process. Further, the trainer 110 includes a model validator 126 configured to test the performance of the machine learning model 124 and validate that it is sufficiently accurate (e.g., the accuracy of the machine learning model 124 at recognizing the 3D model 108 in the virtual scene variations 118 exceeds a defined accuracy threshold, etc.). When the machine learning model 124 is validated, the digital model trainer 110 outputs it as a trained learning model 128, which may then be applied in various situations to identify, recognize, and/or interact with the real-world object 102 and/or other similar real-world objects.

It should be understood that, while the digital model trainer 110 is illustrated as part of the system 100 in FIG. 1, in some examples, the digital model trainer 110 and/or other components of the system 100 may be implemented and/or located separately from the system 100, such that the operations performed by the separate components may be performed outside of the system 100. For instance, the system 100 may be used to generate a virtual scene and associated variations and then those digital assets may be shared with another entity or system that includes a digital model trainer 110 to train a machine learning model based on those digital assets.

The scene generator 112 is a component that includes hardware, firmware, and/or software configured to generate a virtual scene 114 for use by the trainer 110 as described herein. The scene generator 112 may be configured to generate the virtual scene 114 by generating scene data describing various aspects of the virtual scene 114. For instance, the generated scene data may describe dimensions of the virtual scene 114, presence and/or location of walls or other barriers in the virtual scene 114, the presence and/or location of objects in the virtual scene 114, the location and orientation of the 3D model 108 in the virtual scene 114, the location, direction, and/or qualities of one or more light sources in the virtual scene 114, etc. The virtual scene 114 may be a room that contains only the 3D model 108, a room that contains the 3D model 108 and one or more other objects, an outdoor scene including the 3D model 108 and one or more other objects, etc. It should be understood that the virtual scene 114 may describe a scene that includes a variety of different barriers, objects, and/or light sources as would be understood by a person of ordinary skill in the art without departing from the description. Further, the scene generator 112 may be configured to generate multiple virtual scenes 114, such that the processes described herein may be applied to each generated scene 114 to produce the trained machine learning model 128 without departing from the description. In such an example, a single machine learning model may be trained based each of the multiple virtual scenes 114 or separate machine learning models may be trained for each virtual scene 114 as described herein.

In some examples, the scene generator 112 may be configured to generate a virtual scene 114 that includes scene characteristics or elements that are representative of a real-world scene in which the real-world object 102 is likely to be found. For instance, if the real-world object 102 is a toy block, the generated virtual scene 114 may be generated to include other toys and games of various types, furniture, and/or other features that may be representative of a child's play room or bed room. Alternatively, if the real-world object is a laptop computer, the virtual scene 114 may be generated to include a desk, assorted office supplies, and/or other features that may be representative of an office environment. Configuration of the virtual scene 114 to match environments associated with the real-world object 102 may require input provided by a user (e.g., a user may specifically select objects and features to include in a virtual scene 114 based on the real-world object, a user may classify a library of possible objects and features based on environments in which to included them and then, upon generation of the virtual scene 114, a user may select the environment that most closely fits the real-world object 102 and the scene generator 112 may be configured to include the objects and/or features that are classified to that environment, etc.).

In some examples, the scene generator 112 receives data associated with the capture device 104 and the associated process of capturing the image data of the real-world object 102 from the sensor model 111. The sensor model 111 is a component of the digital model trainer 110 that includes hardware, firmware, and/or software configured to provide data associated with the capture device 104. The sensor model 111 may be configured to inform the scene generator 112 about features, settings, and/or parameters of the capture device 104 and the associated data capture process. For instance, the sensor model 111 may provide a type of the capture device (e.g., a depth camera, a grey scale camera, an RGB camera, etc.), settings of the capture device (e.g., a focal length setting of the capture device, a capture quality setting, a type of capture (e.g., multiple image capture, video capture, etc.), etc.). The scene generator 112 and/or variation generator 116 may receive the data provided by the sensor model 111 and generate associated scene data and/or scene variation data based on the received data (e.g., a level of quality of the captured data of the real-world object or other parameters of the capture data may be used to determine a level of resolution or quality to use in generating the scene, etc.). The generation of the scene may be performed differently based on the data (e.g., a camera of a mobile phone may render pixels differently than a conventional camera and the scene generator 112 may be configured to render the scene to match the style of the rendered pixels, etc.). In some examples, the sensor model 111 may automatically detect the capture device data of the capture device 104 based on the digitized 3D model 108 and/or data received directly from the capture device 104. Alternatively, or additionally, the digital model trainer 110 may be configured to enable a user to manually provide capture device type, settings, and/or parameter data and/or select a predefined capture device type and/or settings profile.

The variation generator 116 is a component of the digital model trainer 110 that includes hardware, firmware, and/or software configured to generate a plurality of virtual scene variations 118 based on the virtual scene 114. Each variation 118 may be based on at least one variation category 120. Variation categories 120 may be used to arrange and/or classify possible variations in order to direct the training of the machine learning model 124. For instance, variation categories 120 may include 3D model 108 location and/or position categories, other object location and/or position categories, lighting categories, surface quality categories (e.g., reflectivity, opacity, color, pattern, texture, material, etc.), perspective location, position, and/or angle qualities, capture technology qualities (e.g., portrait or landscape view, resolution of captured image, etc.), scene dimension qualities, dynamic scene qualities (e.g., objects in motion in the scene, light sources flickering or flashing, etc.), etc. Each variation category 120 may include sub-categories (e.g., an "other objects position" category may include a sub-category associated with variations that include other objects positioned to block or obstruct a portion of the 3D model 108, etc.) and/or overlap with other categories 120 (e.g., a variation may include variance of lighting and surface quality of objects in the scene, such that the variation is in both a lighting category and a surface quality category, etc.).

In some examples, the variation generator 116 may be configured to generate a defined number of virtual scene variations 118. A user or users may define a minimum and/or maximum number of variations 118 to be generated by the variation generator 116 (e.g., a minimum may be based on a number of variations required to attain a desired level of training accuracy, a maximum may be based on practical memory and/or storage limitations of the system 100 and/or limitations on the resulting trained machine learning model 128, etc.). Other aspects of the variation generation process and resulting machine learning model may also be considered when determining a total number of variations to generate without departing from the description.

The variation generator 116 may be configured to generate the variations 118 by varying one or more elements or characteristics of the virtual scene 114. For instance, variations 118 in a lighting-based variation category 120 may be generated by varying the number of light sources in the scene 114, the intensity of the light source(s) in the scene 114, the location of light source(s) in the scene 114, and/or other qualities of the light source(s) in the scene 114 (e.g., sunlight qualities, artificial light qualities, etc.). Virtual scene variations 118 may be generated by the variation generator 116 to include variance in any single aspect of the lighting of the scene 114 or variance in multiple aspects of the lighting of the scene 114. Further, a variation 118 may include variance in scene characteristics that are from multiple variation categories 120 as described above. Variations that are made may be determined randomly or pseudo randomly within any configuration or guidance settings that may be provided to the variation generator 116.

Additionally, the variation generator 116 may be configured to generate the variations 118 using dynamic degrees of variance for the varied aspects of the scene 114. In some examples, the degree of variance between the variations 118 may be determined based on a defined limitation of the number of variations 118 to be generated, a desired or required accuracy level of the trained machine learning model 128, and/or a level of performance of the machine learning model 124 during validation by the model validator 126 as described herein. For instance, if extreme accuracy of the trained model 128 is prioritized over any limitation on the number of variations 118 generated, the degree of variance between variations 118 may be relatively small (e.g., adjusting the location of objects positioned to partially block or obstruct the view of the 3D model 108 in the scene by 1 millimeter for each variation 118, etc.). Alternatively, practical considerations (e.g., time, memory resources, and/or processing resources required to generate the variations 118 and/or train the model 124, etc.) may result in the degree of variance between variations 118 being larger (e.g., the location of the objects in the scene being adjusted by 1 centimeter for each variation 118, etc.).

It should be understood that, in some examples, the generation of the virtual scene 114 by the scene generator 112 and/or the associated virtual scene variations 118 by the variation generator 116 includes generating label and/or annotation data associated with the various digital assets and qualities of the scene 114 and variations 118 (e.g., the scene generator 112 may be configured to generate label and/or annotation data associated with the virtual scene 114 and the variation generator 116 may be configured to generate and/or update label and/or annotation data in generate scene variations 118 based on the characteristics that are altered, etc.). For instance, each object in the scene 114, including the 3D model 108, may include at least one label identifying and/or classifying the object. Such an identifying label may be associated with every portion of the object within the scene 114 (e.g., every pixel, voxel, or other basic element of the object may be associated with the identifying label, etc.). Further, specific portions, identifiable geometric surfaces (e.g., planar, cylindrical, spherical, etc.), or elements and/or characteristics of objects or other assets in the scene 114 and variations 118 may include identifying and/or descriptive labels and/or annotations that provide additional, specific information (e.g., the 3D model 108 may include labels associated with each surface, edge, and/or vertex of the represented object, providing comprehensive data about the model 108's position in the scene 114 relative to other objects and/or assets therein, etc.). Labels may further include asset type labels, a surface description labels, material description labels, and/or cuboid edge and vertex labels (e.g., a cuboid frame may be rendered around the dimensions of an object to form a cuboid with edges and vertexes, etc.). Such labels and/or annotations may be applied automatically to the objects of the scene 114 and associated variations 118 upon generation of the objects. Such "machine labeling" provides the digital model trainer 110 and, in particular, the model trainer 122 with a comprehensive data set with which to train the machine learning model 124 as described herein.

In some examples, the real-world object and, therefore, the 3D model may include potential variations that may be used to generate the scene variations 118. For instance, if the 3D model is of a laptop that can be in a closed state, an open state, or partially open to some degree, the variation generator 116 may be configured generate scene variations 118 that include the 3D model of the laptop in different open states or closed states.

The model trainer 122 may be a component of the digital model trainer 110 that includes hardware, firmware, and/or software configured to train a machine learning model 124 into a trained machine learning model 128 (e.g., an artificial intelligence (AI) model, etc.) that is capable of recognizing, identifying, and/or guiding interaction with a real-world object 102 based on the virtual scene variations 118. The model trainer 122 may be configured to make use of one or more known machine learning algorithms and/or techniques, as would be understood by a person of ordinary skill in the art, in order to train the machine learning model 124. Because the virtual scene variations 118 include comprehensive identifying and/or descriptive label data, the model trainer 122 is enable to thoroughly train the machine learning model 124 based on all the various details present in each virtual scene variation 118.

In some examples, the machine learning model 124 includes a plurality of weights and conditions that are applied to the data of a virtual scene variation 118 and evaluated (e.g., conditions may be evaluated based on input data to determine a result and weights may be applied to input data and/or condition results to determine to what degree the ultimate result is affected by the input data or condition result, etc.). The weights and conditions of the machine learning model 124 may be applied to the virtual scene variation 118 at a granular level (e.g., the weights and conditions may be applied to each pixel, identifying whether the tested pixel is part of the 3D model 108 or not, etc.). The results of the evaluation include an identification of the location, position, and/or orientation of the 3D model 108 118 within the virtual scene variation 118. The model trainer 122 analyzes the results of the application of the machine learning model 124 to determine the degree to which the evaluation was correct by comparing the result to the label data of the virtual scene variation 118, which indicates, with perfect accuracy, the location, position, and orientation of the 3D model 108.

Based on the comparison, the model trainer 122 is configured to adjust the machine learning model 124 to increase the accuracy of the weights and conditions of the machine learning model 124 at identifying the 3D model 108 in the scene variation 118. Such adjustments may be made based on any known applicable machine learning technique. The adjustments may include changing the current weights and/or conditions as well as introducing new weights and conditions to the machine learning model 124. The model targeter 125 may be configured to determine what weights and conditions should be adjusted and to what degree they should be adjusted and to further guide what aspects of the 3D model 108 the machine learning model 124 is trained to recognize (e.g., the model 124 may be trained to recognize a table, recognize a planar surface of the table, recognize a reflective aspect of the surface of the table, and/or multiple different aspects in parallel, etc.).

In some examples, the machine learning model 124 is a neural network model that includes an increasingly complex hierarchy of conditions to evaluate each pixel of a virtual scene variation 118 for the presence of the 3D model 108 as the model trainer 122 adjusts it to be more and more accurate. The neural network model behaves as a filter for pixels of the scene variation 118, flagging each pixel that it determines is part of the 3D model 108.

The model validator 126 is a component of the digital model trainer 110 that includes hardware, firmware, and or software configured to validate the performance of the machine learning model 124 as described herein. In some examples, the model validator 126 is configured to access the machine learning model 124 after the model trainer 122 has trained it and apply the model 124 to a subset of virtual scene variations 118 or other similar variations and measure the performance of the model 124 in recognizing or identifying the presence, position, and/or orientation of the 3D model 108. The model validator 126 may generate a performance percentage, score, or other value that is indicative of the performance of the model 124 and compare the generated value to a defined performance threshold. If the performance value of the model 124 matches and/or exceeds the performance threshold, the model 124 may be considered validated. A validated model may be output by the data model trainer 110 as a trained machine learning model 130.

Alternatively, if the model validator 126 determines that the performance value of the model 124 does not match or exceed the performance threshold, the digital model trainer 110 may be configured to generate additional virtual scene variations 118 and continue training the machine learning model 124 based on newly generated virtual scene variations 118 and/or previously generated virtual scene variations 118.

In some examples, the model validator 126 is configured to validate the performance of the machine learning model 124 based on specific variation categories 120 and/or on other aspects of the virtual scene variations 118. The model validator 126 may be configured to identify categories or areas in which the machine learning model 124 is not sufficiently accurate and, upon identifying such weak points, the digital model trainer 110 may generate virtual scene variations 118 specifically tuned to those categories and/or areas and continue training the machine learning model 124. After the machine learning model 124 is retrained, the model validator 126 may be configured to re-test the machine learning model 124 generally and/or based on the specific categories or areas that were found to be weak points previously. By establishing this validation loop, the digital model trainer 110 and associated components are configured to tune the performance of the machine learning model 124 based on specific categories and/or areas.

The trained machine learning model 128 is the resulting output of the training of the machine learning model 124 by the digital model trainer 110. The weights and conditions and other aspects of the trained machine learning model 128 are established after having been adjusted based on the processes of the digital model trainer 110 described herein. the model 128 is configured for applications that require identification or recognition of the real-world object 102 by a machine based on image input, video input, or other associated input data. Further, the object recognition functionality provided by the trained machine learning model 128 may be used to further interact with a real-world object 102 (e.g., a robotic arm that is guided by video input to pick up the object 102 and move it to another location, etc.).

Figure 2:
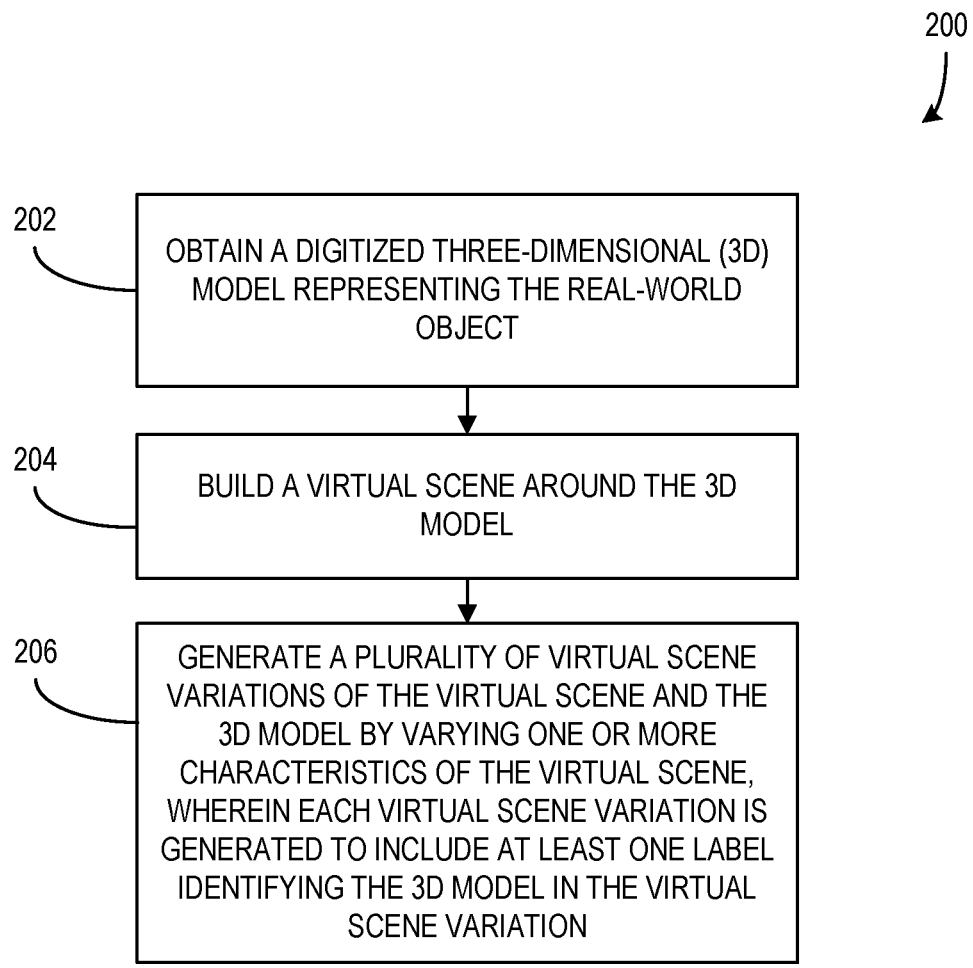
FIG. 2 is an exemplary flow chart illustrating a method of generating a plurality of virtual scene variations according to an embodiment.

FIG. 2 is an exemplary flow chart 200 illustrating a method of generating a plurality of virtual scene variations (e.g., virtual scene variations 118, etc.) according to an embodiment. In some examples, the operations of flow chart 200 described herein may be performed by a model training system (e.g., system 100, etc.) and components thereof. At 202, a digitized three-dimensional (3D) model representing the real-world object is obtained. The 3D model may be obtained from a capture device (e.g., capture device 104, etc.), model generation software (e.g., digital model generation software 107, etc.), and/or another source.

At 204, a virtual scene (e.g., virtual scene 114, etc.) is built around the 3D model. Building the virtual scene may be based on configuration settings and/or rules as described above. The virtual scene may include dimensions (e.g., room dimensions if the scene is an indoor scene, etc.), other objects, representations of people or animals, or the like. Further, the scene may include features such as lighting features. In some examples, the virtual scene may be built based on a scene type, as selected by a user or automatically selected by the system. The scene type may influence what type of objects or people are built into the scene (e.g., furniture, office supplies, books, computers, etc.) as well as influencing other features (e.g., an office-based scene may include fluorescent lighting features, while an outdoor-based scene may include sunlight features, etc.).

In some examples, building the virtual scene includes generating identifying and/or descriptive labels or annotations for objects, elements, and/or portions of elements of the scene. The generated labels are stored as data associated with the virtual scene and may be used during generation of the virtual scene variations and training the machine learning model as described herein.

At 206, a plurality of virtual scene variations of the virtual scene and the 3 D model are generated by varying one or more characteristics of the virtual scene. The virtual scene variations are generated to include at least one label identifying the 3D model in the virtual scene variation as described herein. In some examples, the generation of the virtual scene variations may include generating virtual scene variations based on a plurality of defined variation categories as described herein. The quantity of scene variations generated exceeds a minimum threshold to ensure that there is sufficient training material with which to train the machine learning model. Alternatively, or additionally, the quantity scene variations generated may be affected by practical considerations, such as time required, processing resources, memory resources, and/or other storage resource considerations.

In some examples, a machine learning model may be trained to identify the 3D model in the virtual scene based on the generated plurality of virtual scene variations. The training of the machine learning model may include application of one or more machine learning algorithms and/or techniques as would be understood by a person of ordinary skill in the art. In some examples, the machine learning model is applied to each scene variation and, based on the accuracy with which the machine learning model identifies the 3D model in a scene variation, the machine learning model is adjusted to improve its accuracy. Such adjustments may include adjusting conditions that are evaluated based on input data during the application of the machine learning model and/or adjusting weights that determine the degree of affect input data and/or condition evaluation results have on the 3D model identification output of the machine learning model.

Further, the trained machine learning model may be configured to be applied to visual data to identify the real-world object in the visual data. The trained machine learning may be provided to other devices and/or applications that are configured to apply the trained machine learning model to image input data, video input data, etc. that may or may not include the real-world object for which the machine learning model is trained and/or other similar objects. The trained learning machine model may be applied to such data to detect the presence of the real-world object, detect the position and/or orientation of the real-world object, and/or provide guidance for interaction with the real-world object (e.g., guiding a machine-driven vehicle through an environment without colliding with other objects, people, guiding a robot to identify the presence and orientation of a defined object or confirm that the object is not present, etc.).

Figure 3:
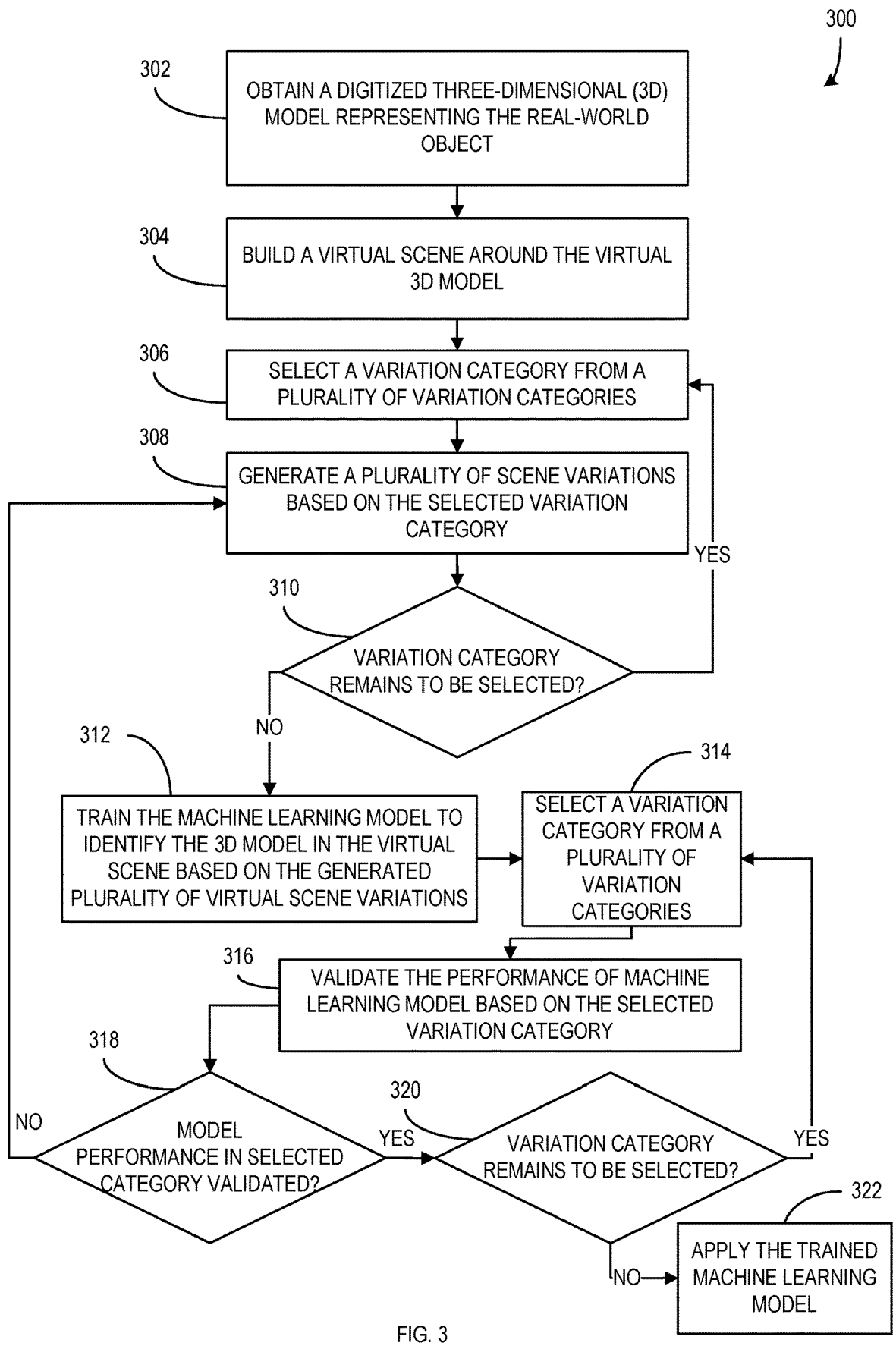
FIG. 3 is an exemplary flow chart illustrating a method of training a machine learning model based on generated virtual scene variations of multiple variation categories and validation of the machine learning model based on the variation categories according to an embodiment.

FIG. 3 is an exemplary flow chart 300 illustrating a method of training a machine learning model based on generated virtual scene variations of multiple variation categories and validation of the machine learning model based on the variation categories according to an embodiment. In some examples, the operations of flow chart 300 described herein may be performed by a model training system (e.g., system 100, etc.) and components thereof. The processes at 302-304 are performed in substantially the same way as 202-204 of FIG. 2 described above.

At 306, a variation category (e.g., variation category 120, etc.) is selected and, at 308, a plurality of scene variations is generated based on the selected variation category. The generation of the plurality of scene variations may be performed as described herein, with each of the scene variations include at least one variance in an element or characteristic associated with the selected variation category (e.g., for the lighting category, all the generated scene variations include variance in at least one characteristic of the lighting of the scene, such as brightness of the lighting, location of light sources, dynamic changes in the lighting, etc.). In some examples, the generated scene variations may include variance in other characteristics as well. A number of scene variations based on the selected variation category may be generated based on a user-defined quantity value and/or a defined fraction of a total quantity of scene variations of all variation categories to be generated (e.g., a user may define that 5 million scene variations be generated for each variation category or that, of 30 million total scene variations, 10% of the scene variations should be associated with the selected variation category, etc.).

At 310, if one or more variation categories remain to be selected, the process returns to 306. Alternatively, if no variation categories remain to be selected, the scene variation generation is complete and the process proceeds to 312.

At 312, the machine learning model is trained to identify the 3D model in the virtual scene based on the generated plurality of virtual scene variations. The training of the machine learning model is performed in substantially the same way as described above with respect to 208 of FIG. 2. After the machine learning model has been trained, at 314, a variation category is again selected from the plurality of variation categories for the purpose of model validation.

At 316, the performance of the machine learning model is validate based on the selected variation category. In some examples, the machine learning model is applied to a set of scene variations that are associated with the selected variation category (e.g., each scene variation includes a variance in a characteristic of the selected variation category, etc.). The validation of the machine learning model may be performed in substantially the same way as described above with respect to the FIG. 1 description of the functionality of the model validator 126.

At 318, if the model performance in the selected category is validated (e.g., a performance score of the model exceeds a defined performance threshold, etc.), the process proceeds to 320. At 320, if there remain variation categories to be selected for validation, the process returns to 314.

Alternatively, if the model performance is not validated in the selected category at 318, the process returns to 308, where more scene variations associated with the selected variation category are generated. The model may then be trained in the selected category at 312 based on the newly generated scene variations in order to increase the accuracy of the model with respect to the selected variation category. Then, at 314-318, the model may be tested for validation again to determine whether the new round of training was sufficient. The process continues to validate the trained machine learning model for each variation category until the model is sufficiently accurate with respect to all variation categories.

If, at 320, there are no variation categories remaining to be selected for validation, then the machine learning model has been validated for all variation categories. The process proceeds to 322, where the trained machine learning model may be applied to enable recognition, identification, and/or interaction with a real-world object as described herein.

Figure 4:
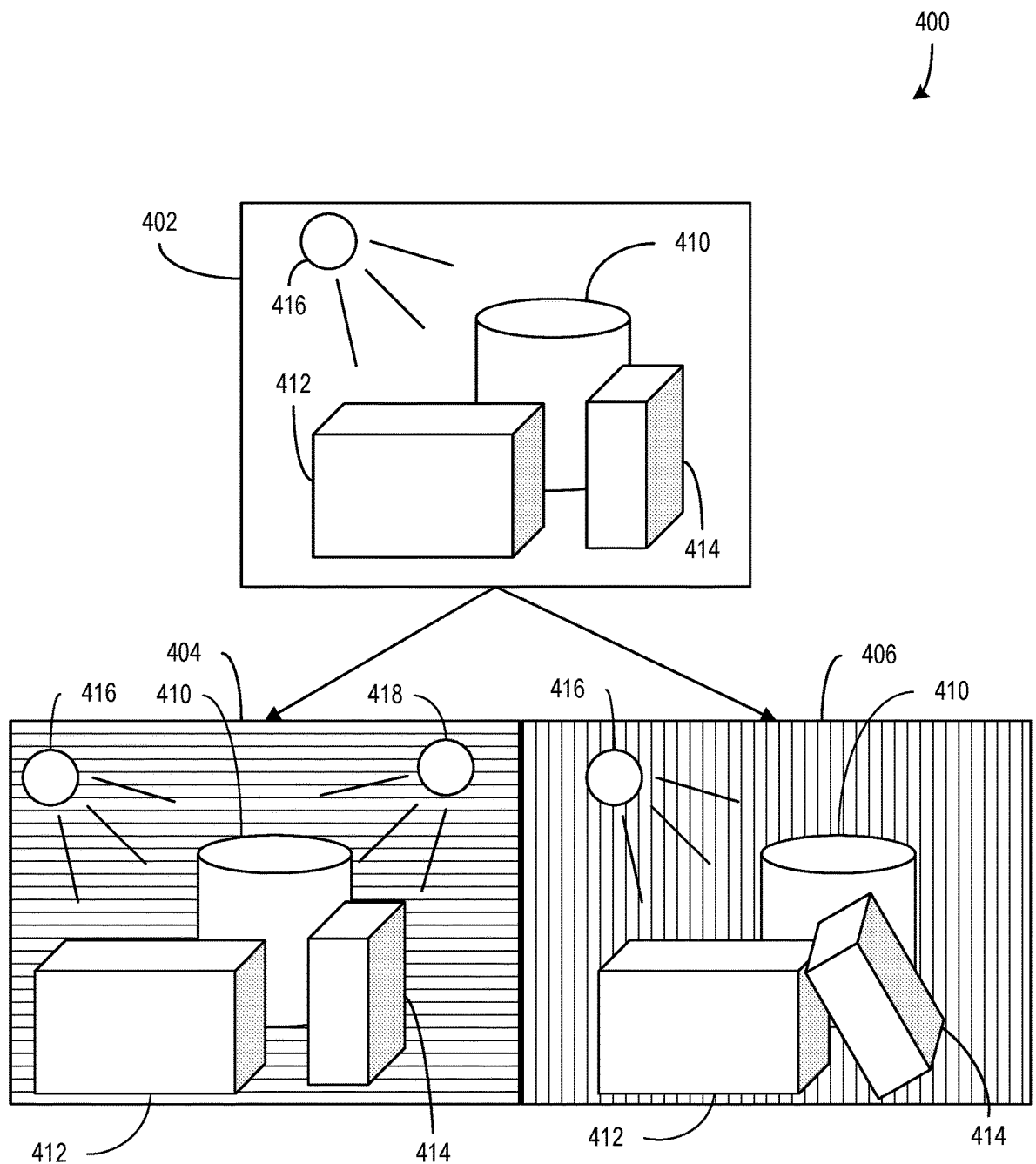
FIG. 4 is an exemplary illustration of a virtual scene and associated scene variations according to an embodiment.

FIG. 4 is an exemplary illustration 400 of a virtual scene 402 and associated scene variations 404 and 406 according to an embodiment. In some examples, the virtual scene 402 and associated scene variations 404 and 406 are built and/or generated by a system (e.g., system 100, etc.) and associated components using methods (e.g., operations described with respect to flow charts 200 and/or 300, etc.) as described herein. The virtual scene 402 is generated to include a 3D model 410 that represents a real-world object. The scene 402 includes other objects 412 and 414, which are positioned in the scene 402 to partially block or obstruct the 3D model 410. Further, the scene 402 includes a light source 416 positioned to cast virtual light across the scene 402 and the 3D model 410 and objects 412 and 414 therein. Finally, scenes 404 and 406 include different appearance patterns behind the foreground objects, as illustrated by the varied background patterns, to introduce further variation and enable the eventual machine learning model to handle such variations. It should be understood that the scene 402 is exemplary and that other scenes may be generated with more, fewer, or different objects, features, characteristics, etc. without departing from the description herein.

Based on the scene 402, scene variations 404 and 406 are generated (e.g., by a variation generator 116, etc.). Each scene variation includes objects, features, and/or characteristics of the scene 402 and, further, at least one variation is introduced. For instance, in scene variation 404, a second light source 418 has been introduced to cast virtual light across the 3D model 410 and objects 412 and 414 from another direction. Such lighting variations may be used to train a machine learning model to recognize the real-world object represented by the 3D model 410 in environments with different lighting characteristics (e.g., environments with differing quantity, direction, brightness, color, etc. of light sources, etc.). In other examples, a large number of scene variations may be generated that vary the number and/or position of light sources in the scene as described herein, enabling the system to train the machine learning model to identify the real-world object in a variety of lighting environments.

Additionally, the scene variation 406 is generated to include the same objects 412 and 414 and light source 416 as in the virtual scene 402. However, the position of the object 414 has been changed, such that it obstructs the 3D model 410 in a slightly different way. Such position variations may be used to train a machine learning model to recognize the real-world object represented by the 3D model 410 when it is partially obstructed in different ways. In other examples, a large number of scene variations may be generated that vary the number and/or position of objects that obstruct the 3D model 410 as described herein, enabling the system to train the machine learning model to identify the real-world object in environments that include a wide variety of other objects in various positions.

Additional Example Scenarios

Aspects of the disclosure enable various additional scenarios, such as next described.

In an example, a user has captured a variety of images of a particular flower and generated a 3D model of the flower using software. The user wants to create a trained machine learning model that can be applied to other photos and quickly and accurately identify the presence of similar flowers. The user uploads the 3D model data into a digital model trainer system (e.g., digital model trainer 110, etc.). The digital model trainer system receives the 3D model data and begins generating a virtual scene that includes the 3D model. Labels are automatically applied to the 3D model and other objects and/or assets of the virtual scene as it is generated. Once the scene is completely generated, the digital model trainer system begins to generate virtual scene variations as described herein. 3 million virtual scene variations are generated, which is the default number to be generated by the digital model trainer. The virtual scene variations are then used to train a machine learning model as described herein. Once trained, the digital model trainer validates the machine learning model by testing its performance using some of the generated virtual scene variations. The trained model is able to correctly recognize the flower model in the virtual scene variations with an accuracy of 85%, which exceeds the default threshold of 80%. The digital model trainer provides the user with the trained machine learning model, which the user uses to scan photos and identify the presence of the particular flower or similar flowers.

In another example, a user wants to create a trained machine learning model that will be used in an industrial context to enable a robotic arm to recognize a particular machine part, pick up the part, and move the part to another location. The user begins by generating a 3D model of the machine part using a combination of images of a machine part and 3D modeling software. The user inputs the 3D model of the machine part into a digital model trainer system. Because the machine learning model is to be trained for a fairly specific environment, the user provides the digital model trainer with environment data associated with the factory. The user may select for the digital model trainer to generate an environment that is industrial and/or provide the digital model trainer with data associated with the particular factory environment (e.g., type of lighting used in the factory, other parts or objects that may be in close proximity to the target machine part, etc.). Once the user has provided the initial input, the digital model trainer generates a virtual scene including the 3D model that includes aspects of the industrial factory environment provided by the user.

The digital model trainer then begins generating virtual scene variations based on the virtual scene. The types of variations generated may also be affected by the input provided by the user. For instance, the user may have indicated that the area where the machine part is found in the factory is often cluttered with other objects, so it is advantageous that a machine learning model be trained to recognize the machine part when partially obscured and to not mistake other parts for the target machine part. The digital model trainer may generate additional virtual scene variations that include objects of different shapes and sizes obstructing the 3D model as well as virtual scene variations including objects that are somewhat similar to the 3D model, such that the machine learning model is trained more comprehensively for those conditions.

When the virtual scene variations are generated, the digital model trainer trains a machine learning model using the virtual scene variations as described herein. After the training process, the machine learning model is validated. The digital model trainer validates the machine learning model based on each variation category. Because of the importance of the real-world machine part being identified in a cluttered field of parts, the validation threshold for a "multiple object obstruction" variation category is increased to 90%. The machine learning model is validated for all other variation categories, but fails to reach the 90% requirement. The user is notified of the result and the digital model trainer proceeds to generate more virtual scene variations that include "multiple object obstruction" variations. The machine learning model is retrained on the newly generated virtual scene variations and validated for the category again. This time, the machine learning model succeeds with 92% accuracy and is provided to the user for application in the factory environment.

Exemplary Operating Environment

Figure 5:
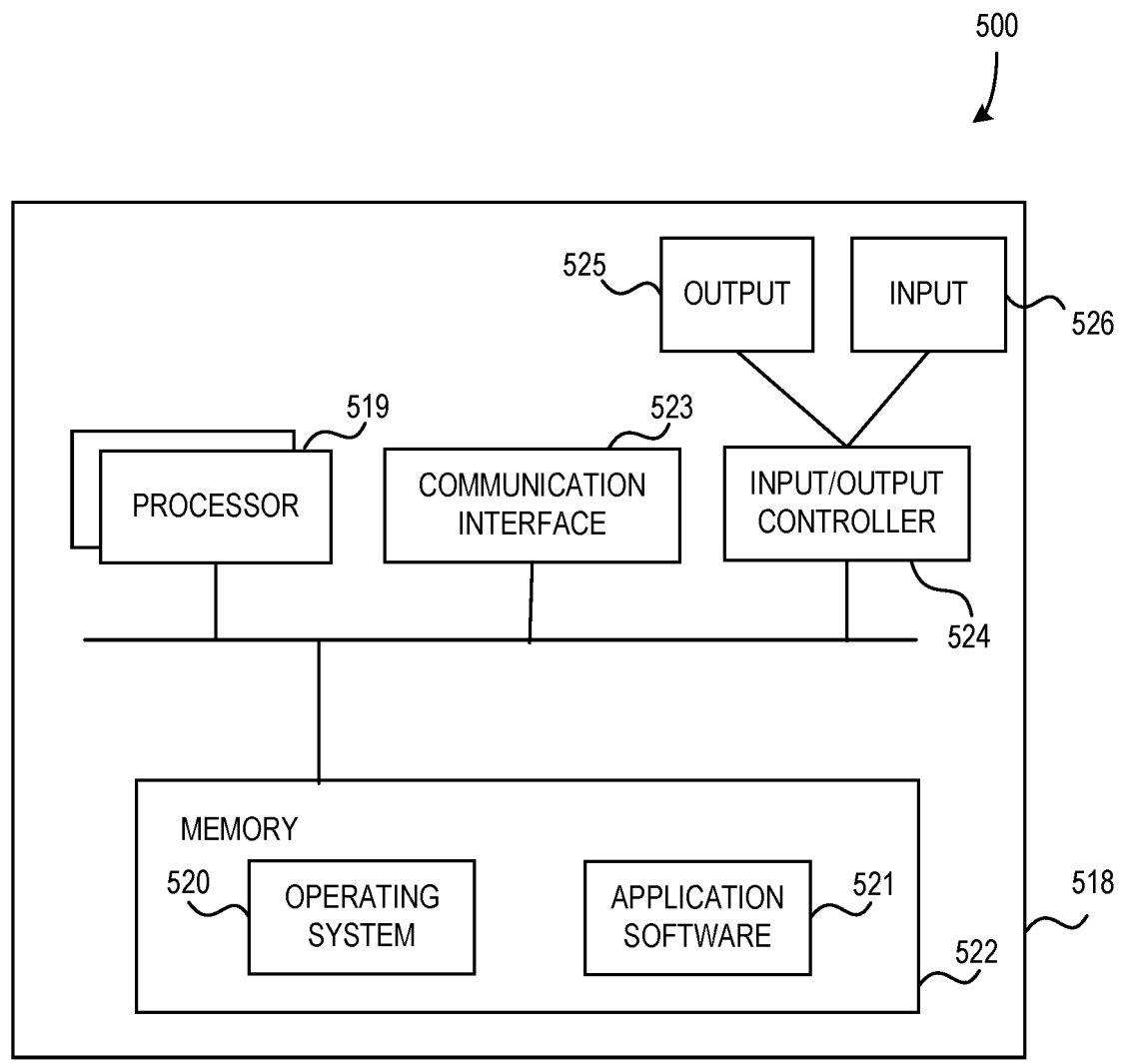
FIG. 5 illustrates a computing apparatus according to an embodiment as a functional block diagram.

The present disclosure is operable with a computing apparatus according to an embodiment as a functional block diagram 500 in FIG. 5. In an embodiment, components of a computing apparatus 518 may be implemented as a part of an electronic device according to one or more embodiments described in this specification. The computing apparatus 518 comprises one or more processors 519 which may be microprocessors, controllers or any other suitable type of processors for processing computer executable instructions to control the operation of the electronic device. Alternatively, or in addition, the processor 519 is any technology capable of executing logic or instructions, such as a hard-coded machine. Platform software comprising an operating system 520 or any other suitable platform software may be provided on the apparatus 518 to enable application software 521 to be executed on the device. According to an embodiment, generating a plurality of virtual scene variations including a 3D model 108 of a real-world object and training a machine learning model to recognize the real-world object based on the generated plurality of virtual scene variations as described herein may be accomplished by software.

Computer executable instructions may be provided using any computer-readable media that are accessible by the computing apparatus 518. Computer-readable media may include, for example, computer storage media such as a memory 522 and communications media. Computer storage media, such as a memory 522, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that the storage may be distributed or located remotely and accessed via a network or other communication link (e.g. using a communication interface 523).

The computing apparatus 518 may comprise an input/output controller 524 configured to output information to one or more output devices 525, for example a display or a speaker, which may be separate from or integral to the electronic device. The input/output controller 524 may also be configured to receive and process an input from one or more input devices 526, for example, a keyboard, a microphone or a touchpad. In one embodiment, the output device 525 may also act as the input device. An example of such a device may be a touch sensitive display. The input/output controller 524 may also output data to devices other than the output device, e.g. a locally connected printing device. In some embodiments, a user may provide input to the input device(s) 526 and/or receive output from the output device(s) 525.

The functionality described herein may be performed, at least in part, by one or more hardware logic components. According to an embodiment, the computing apparatus 518 is configured by the program code when executed by the processor 519 to execute the embodiments of the operations and functionality described. Alternatively, or in addition, the functionality described herein may be performed, at least in part, by one or more hardware logic components. For example, and without limitation, illustrative types of hardware logic components that may be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following:

A system for training a machine learning model to recognize a real-world object, the system comprising:
at least one processor; and
at least one memory communicatively coupled to the at least one processor and storing computer program code, the at least one memory and the computer program code configured to, with the at least one processor, cause the at least one processor to:
obtain a digitized three-dimensional (3D) model representing the real-world object;
build a virtual scene around the 3D model;
generate a plurality of virtual scene variations of the virtual scene and the 3D model by varying one or more characteristics of the virtual scene, wherein each virtual scene variation is generated to include at least one label identifying the 3D model in the virtual scene variation.
generate a plurality of virtual scene variations of the virtual scene and the 3D model by varying one or more characteristics of the virtual scene, wherein each virtual scene variation is generated to include at least one label identifying the 3D model in the virtual scene variation.
wherein the at least one label includes at least one of an asset type label, a surface description label, a material description label, and a cuboid vertex label.
wherein the one or more characteristics include at least one of 3D model position, 3D model orientation, scene dimensions, position of other objects in the scene, orientation of other objects in the scene, surface characteristics of the 3D model or other objects in the scene, material characteristics of the 3D model or other objects in the scene, opacity characteristics of the 3D model or other objects in the scene, and lighting characteristics of the scene.
wherein building the virtual scene includes building the virtual scene based on at least one environment with which the real-world object is associated.
wherein the at least one memory and the computer program code are configured to, with the at least one processor, further cause the at least one processor to train a machine learning model based on the generated plurality of virtual scene variations, the training configuring the machine learning model to identify the real-world object in visual data.

wherein the plurality of virtual scene variations includes subsets of virtual scene variations associated with scene variation categories; and wherein training the machine learning model based on the generated plurality of virtual scene variations includes:

testing the machine learning model using virtual scene variations associated with each scene variation category;

based on testing the machine learning model using virtual scene variations associated with a first scene variation category, determine an accuracy value of the machine learning model associated with the first scene variation category;

based on the accuracy value of the machine learning model associated with the first scene variation category failing to exceed an accuracy threshold, generating a second plurality of virtual scene variations associated with the first scene variation category and training the machine learning model based on the second plurality of virtual scene variations.

wherein the training further configures the machine learning model to enable interaction with the real-world device based on visual data.

wherein generating a plurality of virtual scene variations includes varying the scene by including and positioning one or more virtual objects in the scene, wherein at least one of the one or more virtual objects obscures at least a portion of the 3D model in the scene.

A computerized method for training a machine learning model to recognize a real-world object, the method comprising:

obtaining, by a processor, a virtual three-dimensional (3D) model representing the real-world object;

building, by the processor, a virtual scene around the 3D model;

generating, by the processor, a plurality of virtual scene variations of the virtual scene and the 3D model by varying one or more characteristics of the virtual scene, wherein each virtual scene variation is generated to include at least one label identifying the 3D model in the virtual scene variation.

wherein generating the plurality of virtual scene variations includes, for each virtual scene variation, generating a plurality of digital objects in the virtual scene variation and generating labels identifying locations of each of the generated plurality of digital objects in the virtual scene variation.

wherein the at least one label includes at least one of an asset type label, a surface description label, a material description label, and a cuboid vertex label.

wherein the one or more characteristics include at least one of 3D model position, 3D model orientation, scene dimensions, position of other objects in the scene, orientation of other objects in the scene, surface characteristics of the 3D model or other objects in the scene, material characteristics of the 3D model or other objects in the scene, opacity characteristics of the 3D model or other objects in the scene, and lighting characteristics of the scene.

further comprising training, by the processor, a machine learning model based on the generated plurality of virtual scene variations, the training configuring the machine learning model to identify the real-world object in visual data.

wherein the plurality of virtual scene variations includes subsets of virtual scene variations associated with scene variation categories; and wherein training the machine learning model based on the generated plurality of virtual scene variations includes:

testing the machine learning model using virtual scene variations associated with each scene variation category;

based on testing the machine learning model using virtual scene variations associated with a first scene variation category, determining an accuracy value of the machine learning model associated with the first scene variation category;

based on the accuracy value of the machine learning model associated with the first scene variation category failing to exceed an accuracy threshold, generating a second plurality of virtual scene variations associated with the first scene variation category and training the machine learning model based on the second plurality of virtual scene variations.

wherein the training further configures the machine learning model to enable interaction with the real-world device based on visual data.

One or more computer storage media having computer-executable instructions for training a machine learning model to recognize a real-world object that, upon execution by a processor, cause the processor to at least:

obtain a digitized three-dimensional (3D) model representing the real-world object;

build a virtual scene around the 3D model;

generate a plurality of virtual scene variations of the virtual scene and the 3D model by varying one or more characteristics of the virtual scene, wherein each virtual scene variation is generated to include at least one label identifying the 3D model in the virtual scene variation.

wherein generating the plurality of virtual scene variations includes, for each virtual scene variation, generating a plurality of digital objects in the virtual scene variation and generating labels identifying locations of each of the generated plurality of digital objects in the virtual scene variation.

wherein the at least one label includes at least one of an asset type label, a surface description label, a material description label, and a cuboid vertex label.

wherein the at least one memory and the computer program code are configured to, with the at least one processor, further cause the at least one processor to train a machine learning model based on the generated plurality of virtual scene variations, the training configuring the machine learning model to identify the real-world object in visual data.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for obtaining a digitized three-dimensional (3D) model representing a real-world object; means for building a virtual scene around the 3D model; means for generating a plurality of virtual scene variations of the virtual scene and the 3D model by varying one or more characteristics of the virtual scene, wherein each virtual scene variation is generated to include at least one label identifying the 3D model in the virtual scene variation. The illustrated one or more processors 519 together with the computer program code stored in memory 522 constitute exemplary processing means for generating virtual scene variations and training the machine learning model based thereon as described herein.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for generating virtual scene variations based on a 3D model, the system comprising:
   at least one processor; and
   at least one memory communicatively coupled to the at least one processor and storing computer program code, the at least one memory and the computer program code configured to, with the at least one processor, cause the at least one processor to:
      obtain a digitized three-dimensional (3D) model representing a real-world object;
      build, by a scene generator of the processor, a virtual scene around the 3D model based on data received from a sensor model;
      generate, by the scene generator of the processor, at least one identifying label classifying the 3D model; and
      generate, by the scene generator of the processor, a plurality of virtual scene variations of the virtual scene and the 3D model at least by:
         varying one or more characteristics of the virtual scene per individual virtual scene variations based on at least one variation category, wherein variation categories include at least one of lighting, surface quality, perspective quality, capture technology quality, scene dimension quality, or dynamic scene quality, and
         responsive to the varying, generating at least one descriptive label per individual varied characteristic, the at least one descriptive label describing the individual varied characteristic of the individual virtual scene variation based on the at least one variation category.

2. The system of claim 1, wherein generating the plurality of virtual scene variations includes, for each virtual scene variation, generating a plurality of digital objects in the virtual scene variation and generating labels identifying locations of each of the generated plurality of digital objects in the virtual scene variation.

3. The system of claim 1, wherein the at least one identifying label includes at least one of an asset type label, a surface description label, a material description label, and a cuboid vertex label.

4. The system of claim 1, wherein the one or more characteristics include at least one of 3D model position, 3D model orientation, scene dimensions, position of other objects in the scene, orientation of other objects in the scene, surface characteristics of the 3D model or other objects in the scene, material characteristics of the 3D model or other objects in the scene, opacity characteristics of the 3D model or other objects in the scene, and lighting characteristics of the scene.

5. The system of claim 1, wherein building the virtual scene includes building the virtual scene based on at least one environment with which the real-world object is associated.

6. The system of claim 1, wherein the at least one memory and the computer program code are configured to, with the at least one processor, further cause the at least one processor to train a machine learning model based on the generated plurality of virtual scene variations, the training configuring the machine learning model to identify the real-world object in visual data.

7. The system of claim 1, wherein the at least one memory and the computer program code are configured to, with the at least one processor, further cause the at least one processor to train a machine learning model based on the generated plurality of virtual scene variations that include subsets of virtual scene variations associated with scene variation categories; and
  wherein training the machine learning model based on the generated plurality of virtual scene variations includes:
    testing the machine learning model using virtual scene variations associated with each scene variation category;
    based on testing the machine learning model using virtual scene variations associated with a first scene variation category, determine an accuracy value of the machine learning model associated with the first scene variation category; and
    based on the accuracy value of the machine learning model associated with the first scene variation category failing to exceed an accuracy threshold, generating a second plurality of virtual scene variations associated with the first scene variation category and training the machine learning model based on the second plurality of virtual scene variations.

8. The system of claim 6, wherein the training further configures the machine learning model to enable interaction with a real-world device based on visual data.

9. The system of claim 1, wherein generating a plurality of virtual scene variations includes varying the one or more characteristics of the virtual scene by including and positioning one or more virtual objects in the scene, wherein at least one of the one or more virtual objects obscures at least a portion of the 3D model in the scene.

10. A computerized method for generating virtual scene variations based on a 3D model, the method comprising:
  obtaining, by a processor, a virtual three-dimensional (3D) model representing a real-world object;
  building, by a scene generator of the processor, a virtual scene around the 3D model based on data received from a sensor model;
  generating, by the scene generator of the processor, at least one identifying label classifying the 3D model; and
  generating, by the scene generator the processor, a plurality of virtual scene variations of the virtual scene and the 3D model at least by:
    varying one or more characteristics of the virtual scene per individual virtual scene variation based on at least one variation category, wherein variation categories include at least one of lighting, surface quality, perspective quality, capture technology quality, scene dimension quality, or dynamic scene quality, and
    responsive to the varying, generating at least one descriptive label per individual varied characteristic, the at least one descriptive label describing the individual varied characteristic of the individual virtual scene variation based on the at least one variation category.

11. The computerized method of claim 10, wherein generating the plurality of virtual scene variations includes, for each virtual scene variation, generating a plurality of digital objects in the virtual scene variation and generating labels identifying locations of each of the generated plurality of digital objects in the virtual scene variation.

12. The computerized method of claim 10, wherein the at least one identifying label includes at least one of an asset type label, a surface description label, a material description label, and a cuboid vertex label.

13. The computerized method of claim 10, wherein the one or more characteristics include at least one of 3D model position, 3D model orientation, scene dimensions, position of other objects in the scene, orientation of other objects in the scene, surface characteristics of the 3D model or other objects in the scene, material characteristics of the 3D model or other objects in the scene, opacity characteristics of the 3D model or other objects in the scene, and lighting characteristics of the scene.

14. The computerized method of claim 10, further comprising training, by the processor, a machine learning model based on the generated plurality of virtual scene variations, the training configuring the machine learning model to identify the real-world object in visual data.

15. The computerized method of claim 14, wherein the plurality of virtual scene variations includes subsets of virtual scene variations associated with scene variation categories; and
  wherein training the machine learning model based on the generated plurality of virtual scene variations includes:
    testing the machine learning model using virtual scene variations associated with each scene variation category;
    based on testing the machine learning model using virtual scene variations associated with a first scene variation category, determining an accuracy value of the machine learning model associated with the first scene variation category; and
    based on the accuracy value of the machine learning model associated with the first scene variation category failing to exceed an accuracy threshold, generating a second plurality of virtual scene variations associated with the first scene variation category and training the machine learning model based on the second plurality of virtual scene variations.

16. The computerized method of claim 14, wherein the training further configures the machine learning model to enable interaction with a real-world device based on visual data.

17. One or more computer storage media having computer-executable instructions for generating virtual scene variations based on a 3D model that, upon execution by a processor, cause the processor to at least:
  obtain a digitized three-dimensional (3D) model representing a real-world object;
  build, by a scene generator of the processor, a virtual scene around the 3D model based on data received from a sensor model;
  generating, by the scene generator of the processor, at least one identifying label classifying the 3D model; and
  generate, by the scene generator of the processor, a plurality of virtual scene variations of the virtual scene and the 3D model at least by:
  varying one or more characteristics of the virtual scene per individual virtual scene variation based on at least one variation category, wherein variation categories include at least one of lighting, surface quality, perspective quality, capture technology quality, scene dimension quality, or dynamic scene quality, and
  responsive to the varying, generating at least one descriptive label per individual varied characteristic, the at least one descriptive label describing the individual varied characteristic of the individual virtual scene variation based on the at least one variation category.

18. The one or more computer storage media of claim 17, wherein the at least one identifying label includes at least one of an asset type label, a surface description label, a material description label, and a cuboid vertex label.

19. The one or more computer storage media of claim 17, wherein computer-executable instructions further cause the processor to train a machine learning model based on the generated plurality of virtual scene variations, the training configuring the machine learning model to identify the real-world object in visual data.

20. The system of claim 1, wherein the generated at least one descriptive label describes the individual varied characteristic as an obstruction of the altered virtual asset of the individual virtual scene.

* * * * *